United States Patent [19]

Orain

[11] 4,318,282
[45] Mar. 9, 1982

[54] TRANSMISSION FOR AN AUTOMOBILE VEHICLE COMPRISING TWO SLIDABLE HOMOKINETIC JOINTS

[75] Inventor: Michel A. Orain, Conflans-Ste. Honorine, France

[73] Assignee: Glaenzer Spicer, Poissy, France

[21] Appl. No.: 99,022

[22] Filed: Nov. 30, 1979

[30] Foreign Application Priority Data

Dec. 14, 1978 [FR] France .................. 78 35184

[51] Int. Cl.³ .............................................. F16D 3/30
[52] U.S. Cl. .................................... 64/21; 64/8; 64/17 SP
[58] Field of Search .......... 64/21, 8, 17 R, 17 A, 64/17 SP

[56] References Cited

U.S. PATENT DOCUMENTS

| | | | |
|---|---|---|---|
| 1,987,678 | 1/1935 | Goddard et al. | 64/8 |
| 2,898,749 | 8/1959 | Parkman | 64/8 |
| 3,757,534 | 9/1973 | Orain | 64/8 |
| 3,818,721 | 6/1974 | Wahlmark | 64/8 |
| 3,869,878 | 3/1975 | Davies et al. | 64/21 |
| 3,877,251 | 4/1975 | Wahlmark | 64/8 |
| 3,975,922 | 8/1976 | Orain | 64/21 |
| 4,068,499 | 1/1978 | Sharp | 64/21 |

Primary Examiner—Ira S. Lazarus
Attorney, Agent, or Firm—Wenderoth, Lind & Ponack

[57] ABSTRACT

The transmission comprises two slidable tripod joints. In each joint, the tulip element is extended around the shaft of the tripod element by an abutment member which defines a concave part-spherical surface. A check member having a convex part-spherical surface fitting the concave surface is disposed around the shaft between the tripod element and the abutment member with a radial clearance which is at least equal to the amplitude of the orbital movement of the tripod element at the maximum angle of deviation of the joint. Each joint has a spring which is compressed between the inner end of its tulip element and the adjacent end of the shaft. In this way, the maximum extension of the transmission is distributed equally between the two joints and the shaft is constantly centered so that noise and wear of the check members is avoided. The invention is in particular applicable to transmissions for independent rear driving wheels of automobile vehicles.

7 Claims, 6 Drawing Figures

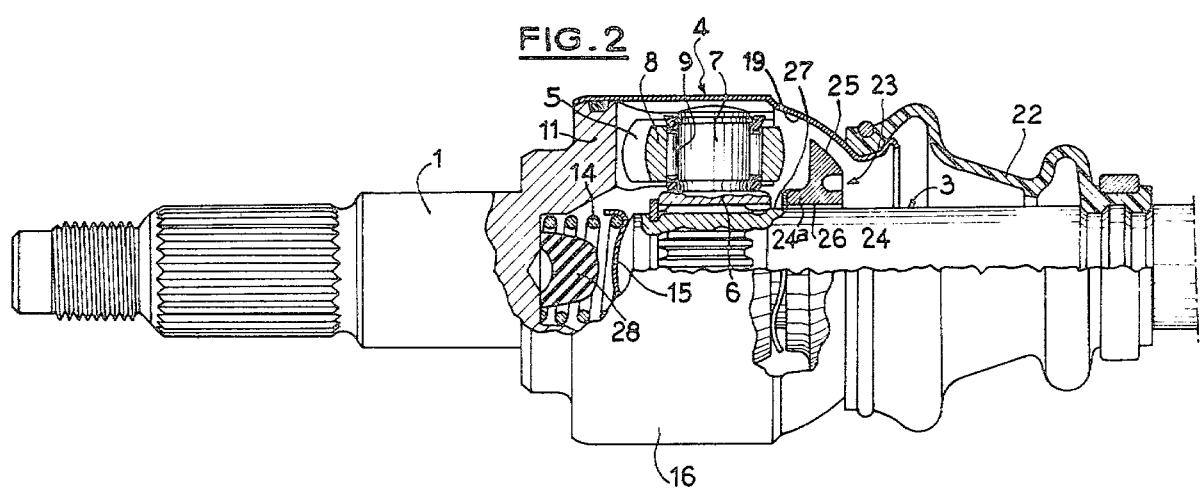

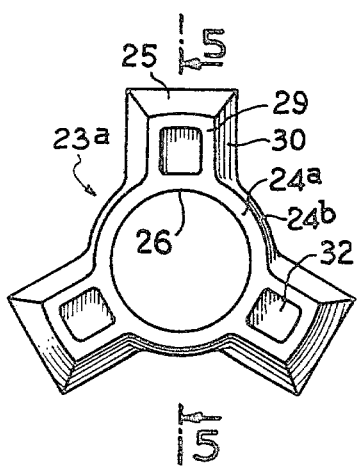
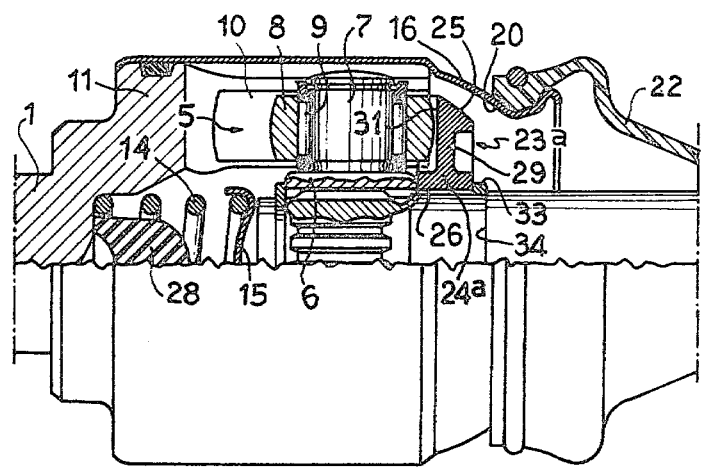
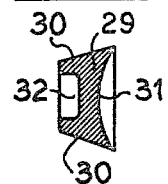
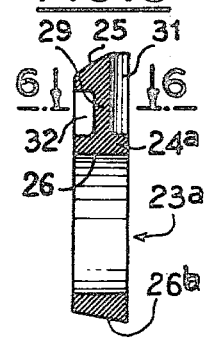

TRANSMISSION FOR AN AUTOMOBILE VEHICLE COMPRISING TWO SLIDABLE HOMOKINETIC JOINTS

The present invention relates to transmissions for automobile vehicles.

Transmissions for rear drive vehicles having a suspended rear axle are known and comprise a driving element, a driven element and an intermediate shaft connected to each of said two elements by a slidable homokinetic joint provided with means for limiting the axial movement which have a continuous end-of-travel contact.

This arrangement permits the distribution of the axial movement of extension or compression between two substantially identical slidable joints which comprise internal means for limiting the axial movement, in particular toward the exterior. Thus it is sufficient that each joint be capable of ensuring one half of the total axial movement of the transmission. On the other hand, with this arrangement, it is found that in practice the shaft constantly bears lightly against one of the means limiting the axial movement of one of the joints and the running in and the wear resulting from operation accentuate this phenomenon. This results in the following two drawbacks:

the axial vibrations which are always present on the wheel side or the driving axle side produce axial percussions and rebounds of the shaft against the thrust bearings which cause noise and shocks which are audible and sometimes disturbing for the passengers. Moreover, when the shock is violent, the axial rebound may create a return shock by contact on a device for limiting the travel for the other direction of movement of the wheel;

wear is concentrated at a single point of the tracks of the slidable homokinetic joint instead of being distributed; consequently, there is a deterioration of the tracks of these joints which occurs prematurely and shortens their life.

An object of the invention is to provide a transmission of the aforementioned type which ensures a complete absence of shocks and a considerable increase in the life of the means for limiting the axial movement.

According to the invention, there is provided a transmission of the aforementioned type which comprises elastically yieldable means for centering the intermediate shaft in a mean axial position relative to the two joints.

Further features and advantages of the invention will be apparent from the ensuing description which is given merely by way of example with reference to the accompanying drawings in which:

FIG. 2 is an axial sectional view of a joint of another embodiment of the transmission according to the invention;

FIG. 3 is an axial sectional view of a joint of another embodiment of the transmission according to the invention;

FIG. 4 is an end elevational view of the retaining member of the joint of FIG. 3;

Figure 1:
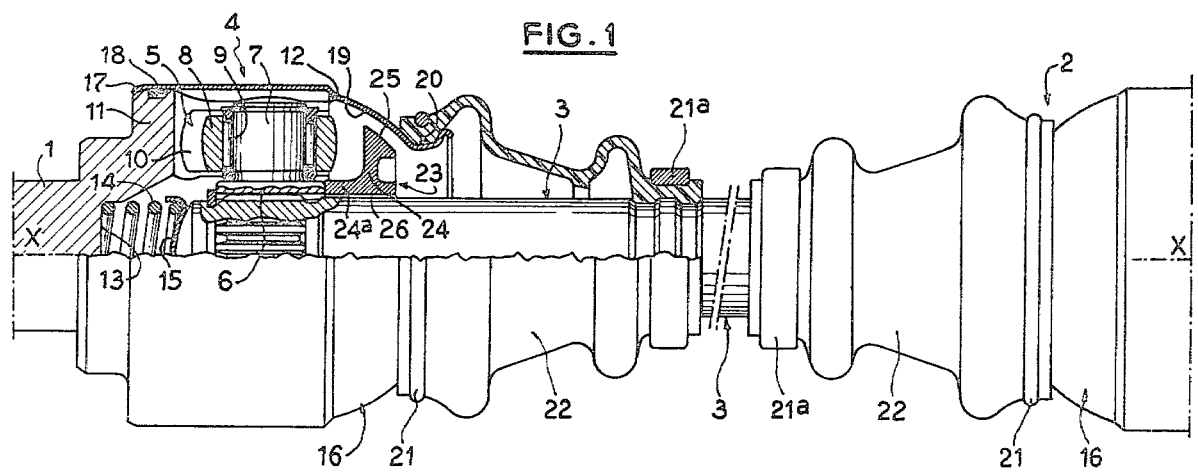
FIG. 1 is a partial axial sectional view of a transmission according to the invention.

FIGS. 5 and 6 are sectional views taken respectively on line 5—5 of FIG. 4 and line 6—6 of FIG. 5.

The transmission of FIG. 1, which is shown to be perfectly aligned on an axis X—X, connects a driving element (not shown) constituted by a stub-axle of a differential of a rear drive automobile having a suspended rear axle, to a driven element 1 formed by an independent rear driving wheel stub-axle. The transmission is effected in succession through a first homokinetic joint 2, an intermediate shaft 3 and a second homokinetic joint 4. The two joints 2 and 4 are identical slidable tripod joints which are disposed symmetrically relative to the intermediate shaft 3. Consequently, solely the joint 4 will be described hereinafter.

The joint 4 comprises a tripod element 5 fixed to the corresponding end of the shaft 3 by an annular skirt 6 which is fitted on the latter. Extending from this skirt in the radial direction are three cylindrical trunnions 7 which are spaced angularly 120° apart and on each of which trunnions is rotatably mounted, by means of a needle bearing 9, a part-spherical roller 8.

Each roller 8 is received in a slot 10 of a tulip element 11 which is rigid with the wheel stub-axle 1. The slots 10 have a part-circular cross-sectional shape and extend in a direction parallel to the axis of the stub-axle 1 and each define two raceways for the associated roller 8. The tulip elements terminate in a planar end face 12 and have in the centre part thereof a cavity 13 having a flat inner end which is perpendicular to the axis X—X. A coil spring 14 is compressed between the end of the cavity 13 and a concave part-spherical cup 15 disposed on the conjugate part-spherical end of the shaft 3 and swivelling on this end.

The joint 4 is completed by a sheet metal case 16 which has a portion which covers the outer peripheral surface of the tulip element 11 and is fixed by a formed-over portion 17 to the end of the tulip element opposed to the shaft 3 with interposition of a sealing element 18. The case 16 is extended beyond the other end of the tulip element 11 and forms a segment of a sphere which has in particular a part-spherical inner surface 19 coaxial with the stub-axle 1. The case 16 terminates at its open end in a groove 20 to which there is fixed by means of a ring 21 the large end of an elastically yieldable bellows or gaiter 22, the other end of this gaiter being directly fixed to the shaft 3 by a collar 21a.

An annular member 23 forming check means is disposed in the volume defined by the part-spherical surface 19. This member comprises a ring 24 having on its periphery a convex part-spherical surface which is conjugate to the surface 19. A radial face of the ring 24 has an annular lightening hollow. Extending from the inner part of the other radial face in the direction of the tripod element 5 is an annular skirt 24a which terminates in a planar end face and is capable of penetrating the centre cavity of the tulip element 11. The ring 24 and the skirt 24a are in one piece and together define a centre bore 26 whose diameter exceeds the diameter of the shaft 3 sufficiently to ensure that the radial clearance is capable of absorbing the orbital movement of this shaft through the maximum possible angle of deviation which corresponds in practice to the maximum extension of the joint.

The member 23 is axially freely movable on the shaft 6. The dimensions thereof are such that when the tripod element is at the maximum angle of deviation and bears against the case 16 through the member 23, its rollers 8 are located at the end of the raceways 10 of the tulip element from which they may emerge. Note that the skirt 24a of the check means 23 is of such length that, in the position of maximum extension of the joint, the sole contact between the tripod element and the check means 23 occurs by contact of the respective skirts 6 and 24a.

The tulip element, the case and the gaiter together define a sealed enclosure which retains the lubricant and protects the mechanism from exterior agents.

The transmission just described operates in the following manner:

In normal operation, the intermediate shaft 3 axially reciprocates to either side of a mean position which is roughly symmetrical relative to the two joints 2 and 4 and is maintained in the vicinity of this position by the two springs 14 which compensate for the lateral accelerations of moderate value, due to the profile of the road surface, by a differential reaction. Under these conditions, in each joint, the member 23 is free of any support and assumes any position between the tripod element and the case 16. Consequently, there is neither friction against nor wear of this member.

For a movement corresponding to maximum compression of the transmission, which is highly infrequent, the two springs 14 are compressed until their coils are substantially in adjoining relation to each other and the movement of compression is automatically distributed equally between the two joints.

For a movement of maximum extension of the transmission, which is also very rare, the skirts 6 of the tripod elements urge the skirts 24a of the respective check members 23 and the latter bear, or almost bear, one after the other or simultaneously, against the inner part-spherical surfaces 19 of the two cases 16, the surface 25 of the check member 23 swivelling on the inner surface 19 of the case 16. The maximum extension of the transmission is thus equally distributed between the two slidable joints 2 and 4. In other words, it is sufficient that the raceway 10 of each tulip element allow, in an angular configuration of the joint, one half of the total sliding of the transmission. Note that in all situations, the two springs 14 perform an important function of a division of the travel between the two joints and a centering of the shaft 3 which normally avoids contact between the members 23 and the cases 16. Moreover, the rollers 8 can never encounter the case 16 or the end of the slots 10 which would have the serious drawback of creating bursts of percussions and noises, as the joints operate at an angle during the rotation.

If the lateral accelerations applied to the vehicle and therefore to the transmission are frequent, in special cases, an elastically yieldable washer 27 may be interposed between the skirt of the check member 23 and the skirt of the tripod element (FIG. 2). This washer may be made either from hardened steel, of the type having corrugations as shown or of the Belleville type, or from a compact or expanded elastomer. It may also be replaced by a very short coil spring which is much stiffer than the springs 14. Likewise, in FIG. 2, an elastomeric abutment 28 placed inside the spring 14 eliminates or reduces the shocks of contact due to adjoining coils of these springs. Apart from the shock-absorbing means 27 and 28, the joint 4 of FIG. 2 is identical to that shown in FIG. 1.

The check member 23 of FIGS. 1 and 2 is only suitable for joints having a relatively short sliding. Indeed, when the total travel of the sliding of the joint, extension plus compression, is large, in order to operate correctly in all configurations of the joint, the check member must be capable of partially or completely penetrating into the tulip element without interfering with the petal portions of the latter. For this purpose (FIGS. 3 to 6), the check member 23a is no longer of revolution but is recessed in three sectors corresponding to the petal portions of the tulip element. In other words, the member 23a is in the form of an annular skirt 24a from which radially extend three arms 29 having a part-spherical end surface 25. Each arm has the same axial dimension as the skirt 24a and a maximum width which enables it to be inserted between two petal portions of the tulip element 11, and this width decreases in the direction away from the tripod element so as to avoid interferences when the joint operates at an angle, owing to the lateral surfaces 30 which are planar but inclined relative to the axis X—X of the shaft 3. Likewise, between the arms 29, the outer surface 24b of the skirt 24a is frustoconical and converges in the direction away from the tripod element. The face 31 of the arms 29 facing toward the tripod element is hollowed in the form of a trough and their opposite face has a cavity 32 for lightening purposes.

The skirt 24a is axially maintained against the skirt 6 of the tripod element by a circlip 33 disposed around the shaft 3 and abutting a shoulder 34 of the latter. The rollers of the tripod element are each received with a slight clearance in a trough 31 of an arm 29, which guarantees the angular setting of the check member 23a relative to the tripod element and consequently the suitable penetration of the arms 29 in the tulip element in the course of the movements of compression of the joint.

The elastically yieldable abutment 28 of FIG. 2 is also provided in this joint. Further, as before, the member 23a is mounted on the shaft 3 with a radial clearance which is substantially equal to the amplitude of the orbital movement of the tripod element for the operating angle corresponding to the end of the extension travel of the joint, that is to say to the position in which the part-spherical surfaces 25 and 19 bear against each other.

The configuration of FIG. 3 is applicable, irrespective of the sliding travel of the joint, but it is preferable to reserve it for the cases where the sliding is large since, on one hand, the member 23a is weaker than the annular member 23 of FIGS. 1 and 2 and, on the other hand, the assembly is more complicated.

The transmissions according to the invention have important advantages:

a. complete absence of shocks and consequently noise for all cases of driving and road surfaces and consequently a guaranteed comfort under all circumstances;

b. utilization of identical slidable joints which constantly equally distribute the axial movements of expansion and compression, each joint thus having minimum volume and weight;

c. perfectly free axial sliding which results in a good filtering of vibrations and a complete isolation of the driving element relative to the driven element and vice-versa;

d. complete safety and reliability of operation;

e. ease of assembly of the slidable joint in the power take-off of the differential by a simple fitting of splines. This assembly is immediate and requires no fixing system. It is highly reliable, absorbs all the clearances and allows a possible disassembly which is also easy and rapid;

f. prolonged life of the joints since wear is distributed throughout the length of the raceways;

g. absence of wear on the members limiting the axial travel of extension and compression; in particular, the check member 23 or 23a may be made from metal, but also from plastics material such as Nylon.

Experience shows that, in practice, the use of needles 9 for the rotatable mounting of the rollers 8 is practically essential in order to achieve axial stability of the shaft under the action of the two opposing springs 14.

Having now described my invention what I claim as new and desire to secure by Letters Patent is:

1. A transmission comprising a driving element, a driven element, a floating intermediate shaft, two friction-free slidable homokinetic joints respectively connecting opposed ends of the intermediate shaft to the driving element and the driven element, each joint comprising means for limiting axial movements employing a continuous end-of travel contact, and elastically yieldable means for centering the intermediate shaft in a mean axial position relative to the two joints, each of said joints being a tripod joint comprising three radial arms on which arms rollers are rotatively mounted with interposition of needles.

2. A transmission as claimed in claim 1, wherein the centering means include means for biasing the transmission to assume its maximum length.

3. A transmission as claimed in claim 2, wherein the tripod joints each comprise a tulip element and the centering means comprise coil springs compressed between an inner end of the tulip element of each joint and the corresponding end of the shaft.

4. A transmission as claimed in claim 1, wherein the means for limiting axial movements limit extension movements and comprise an elastically yieldable shock-absorber.

5. A transmission as claimed in any one of the claims 1 to 4, wherein each tripod joint comprises a tulip element and the tripod element includes a shaft and the rollers engage the tulip element, and the means for limiting axial movements limit extension movements and comprise, for each joint, a concave abutment member which extends the tulip element, and a check member which has a part-spherical surface cooperative with the abutment member, said check member being mounted to be axially and radially floating on the shaft of the tripod element.

6. A transmission as claimed in any one of the claims 1 to 4, wherein each of the tripod joints comprises a tulip element, the tripod element includes a shaft, the rollers engage the tulip element, and the means for limiting axial movements limit extension movements and comprise, for each joint, a concave abutment member which extends the tulip element, a check member which has a part-spherical surface cooperative with the abutment member, and means maintaining said check member in a fixed axial position on the shaft of the tripod element in the vicinity of the tripod element with a radial clearance, the check member having three recessed sectors which define three arms which are capable of penetrating between petal portions of the tulip element and have lateral surfaces which are inclined relative to the axis of the shaft of the tripod element.

7. A transmission as claimed in claim 6, wherein each arm has a surface which faces the tripod element and has a hollow in the form of a trough in which a roller of the rollers carried by the tripod element penetrates.

* * * * *